April 9, 1935. E. WILDHABER 1,996,987
ROTARY GEAR CUTTING TOOL
Filed June 23, 1930 3 Sheets-Sheet 1
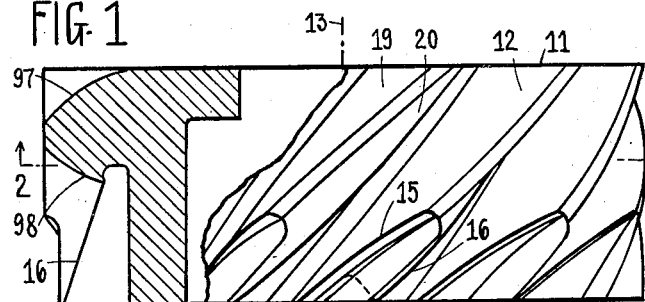
FIG. 1
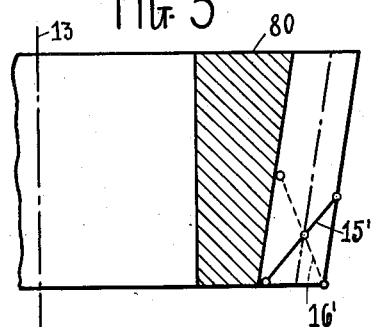
FIG. 3
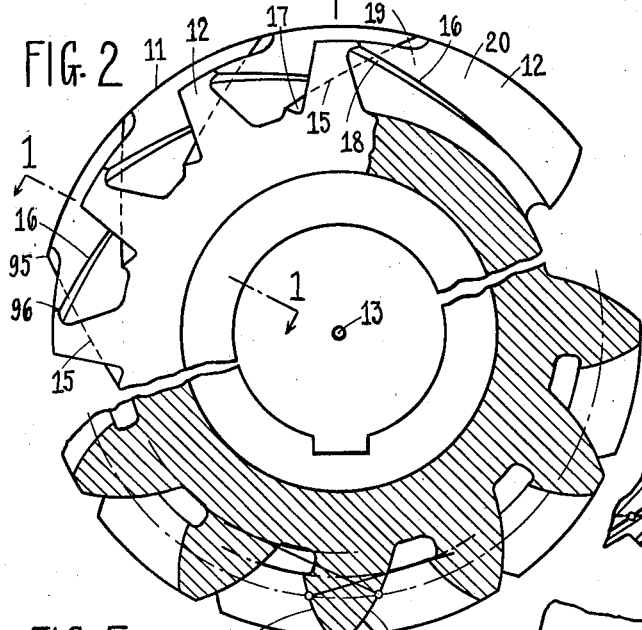
FIG. 2
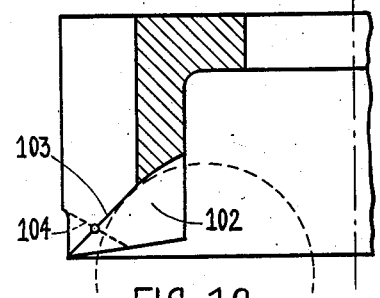
FIG. 4
FIG. 19
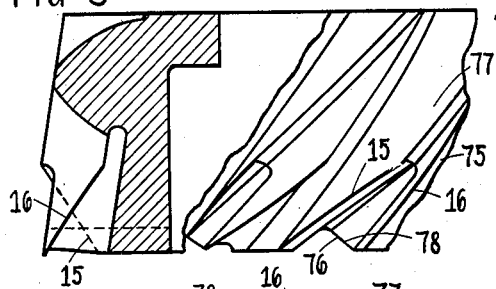
FIG. 5
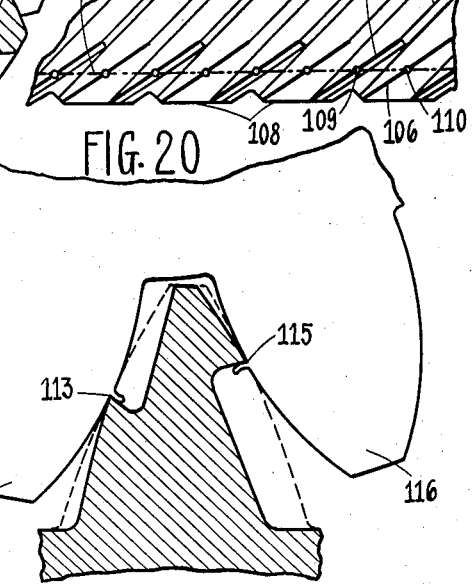
FIG. 20
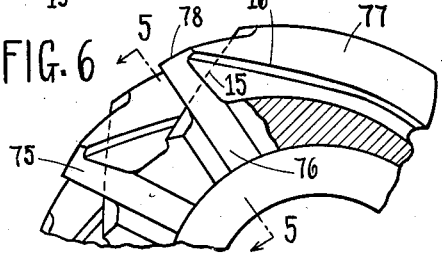
FIG. 6
INVENTOR
Ernest Wildhaber

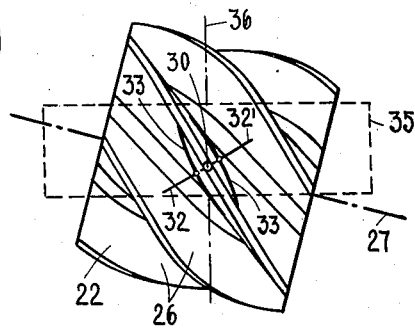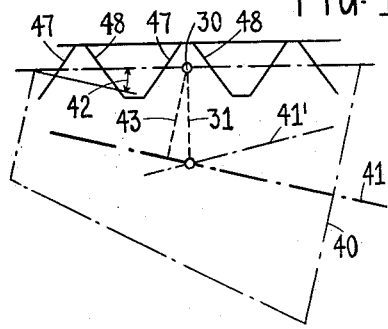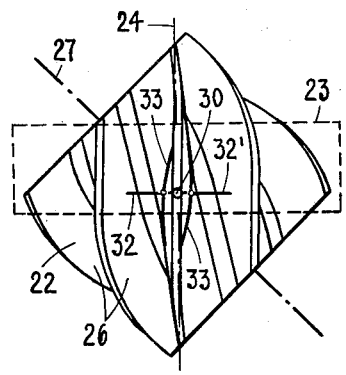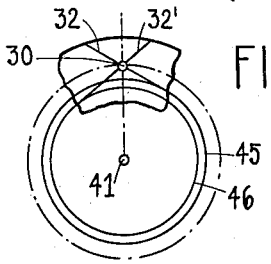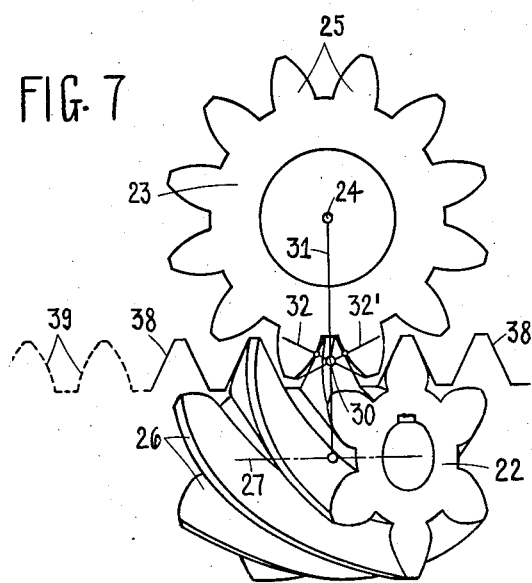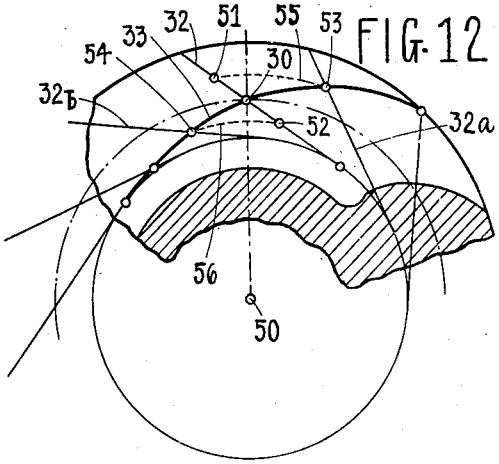

April 9, 1935.  E. WILDHABER  1,996,987
ROTARY GEAR CUTTING TOOL
Filed June 23, 1930   3 Sheets-Sheet 3
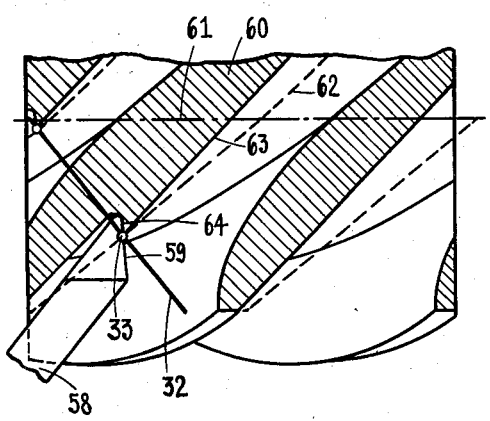
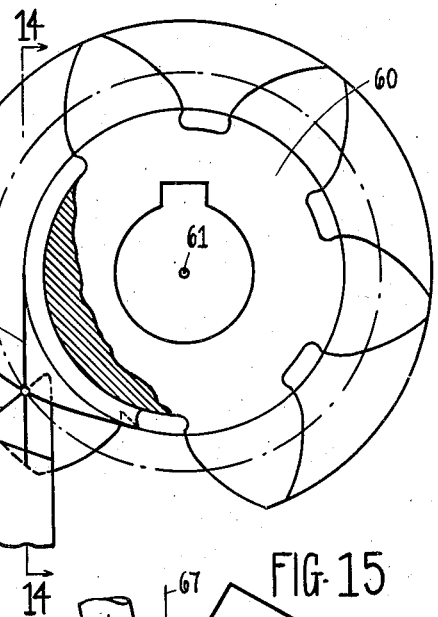
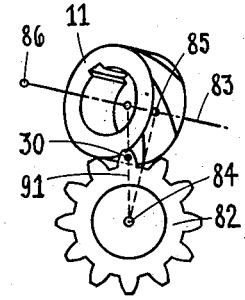
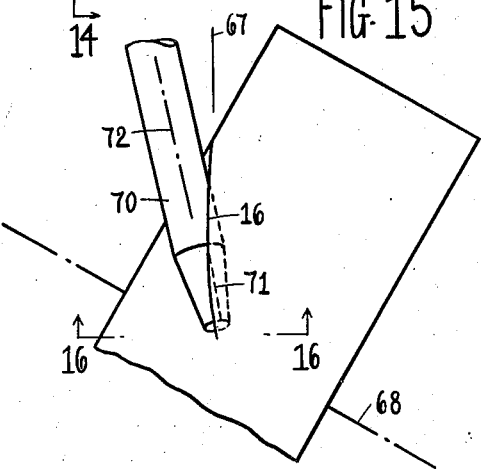
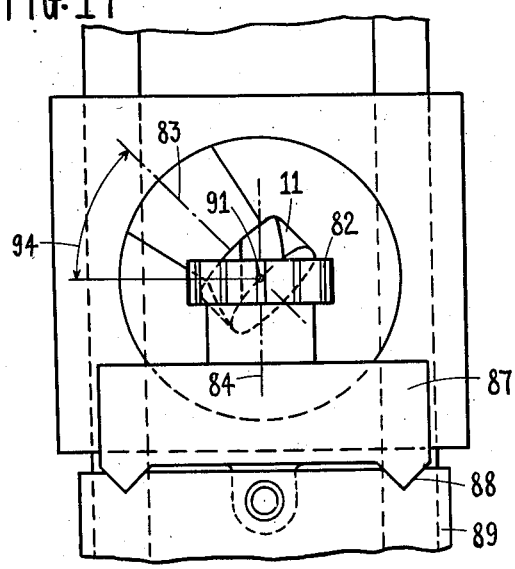
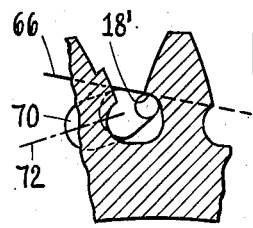
INVENTOR
Ernest Wildhaber Patented Apr. 9, 1935

1,996,987

UNITED STATES PATENT OFFICE 1,996,987

ROTARY GEAR CUTTING TOOL

Ernest Wildhaber, Brooklyn, N. Y.

Application June 23, 1930, Serial No. 463,120

17 Claims. (Cl. 29—103)

The present invention refers to rotary gear cutting tools for cutting gears in a continuous process, in which a gear blank and a tool are rotated in timed relation on their respective axes, while a feeding motion is provided between the tool and the gear blank so that the tool is fed relatively to the gear blank across the face of the latter.

The invention is applicable for cutting gears in general, namely spur gears, helical and herringbone gears, worm gearing, spiral bevel gears and hypoid gears. The rotary gear cutting tools will be particularly described as applied to cutting spur gears, helical gears and herringbone gears.

One object of the present invention is to provide a rotary tool for cutting gears in a continuous process of rotation, which is free from jerks and which at the same time efficiently produces teeth of high accuracy and excellent finish.

Another object of the present invention is to provide a rotary tool having a plurality of identical cutting teeth arranged in a circle about the tool axis and inclined to the periphery of said tool, a cutting edge of a cutting tooth extending upwardly or downwardly on its cutting tooth and also lengthwise of said cutting tooth.

A further object is to provide an efficient rotary tool for cutting spur teeth and also helical teeth and threads in a continuous process, and whose cutting edges have an overlapping finishing action, so that in operation always at least one cutting edge is in finishing contact with a tooth surface of a gear blank.

A still further aim in view is to provide a rotary tool for progressively finishing gear teeth along continuous lines connecting the top and the root of the gear teeth, and for continuously and progressively finishing the teeth of spur gears along continuous lines equally spaced lengthwise of the teeth. Other objects are to devise a tool for forming gears in a continuous process of rotation, in which the cutting pressures are free from the sudden and extreme variations of conventional processes of continuous rotation and in which said cutting pressures are nearly constant, so that they do not alter the exact timed relation of the gear blank and the tool, and that gears are formed with highest accuracy of spacing and of profile.

Other aims are to provide a tool of the aforesaid character, which is capable of cutting gears of various numbers of teeth, and a universal tool capable of cutting all gears of the same normal pitch, regardless of the number of teeth, and regardless of whether the teeth are straight or helical.

Another object is to devise an inexpensive tool of the aforesaid character, having helicoidal side surfaces on its cutting teeth, to provide other cutting edges after resharpening.

Further and important objects are to devise a tool of the aforesaid character, having cutting teeth whose side surfaces are helicoidal surfaces of equal lead, so that after resharpening cutting edges are formed which are identical with the original cutting edges in form as well as in position, and which have the same distance from the tool axis as the original cutting edges.

Other objects will appear in the course of the specification and from recital of the appended claims.

Embodiments of the invention are exemplified in the accompanying drawings, in which Fig. 1 is a plan view of a tool constructed in accordance with the present invention, partly a section along lines 1—1 of Fig. 2.

Fig. 2 is a front view corresponding to Fig. 1, partly a section along lines 2—2 of Fig. 1 and partly a section taken along a tooth bottom.

Fig. 3 is a diagrammatic sectional view of an unrelieved worm shaped member, whose mesh is embodied by the tool shown in Fig. 1 and Fig. 2, and which serves to further explain a preferred embodiment of the present invention.

Fig. 4 is a sectional view of a slightly modified cutting tool constructed in accordance with the present invention.

Fig. 5 is a partial plan view, partly a section along lines 5—5 of Fig. 6 of another cutting tool constructed in accordance with the present invention, illustrative of a modification of it.

Fig. 6 is a partial front view of the tool shown in Fig. 5, partly in section along a tooth bottom.

Fig. 7 is a front view of a spiral pinion or worm member meshing with a gear, explanatory of some of the principles on which the present invention is based.

Fig. 8 is a plan view corresponding to Fig. 7, with the gear indicated by its dotted outline.

Fig. 9 is a plan view of the spiral pinion or worm member also illustrated in Fig. 7 and Fig. 8, and shown in a position of mesh with a helical gear, whose outline is indicated in dotted lines.

Fig. 10 is a diagram relating to a tapered spiral pinion or worm member, further explanatory of the present invention.

Fig. 11 is a partial end view and a diagram of a tapered spiral pinion or worm member.

Fig. 12 is a diagram illustrative of the line of a tooth surface of a spiral pinion or worm member, along which said tooth surface gradually contacts with a gear, point after point. Said line may be embodied as a cutting edge in accordance with the present invention.

Fig. 13 and Fig. 14 are views of a tool explanatory of one way of forming its cutting edges. Fig. 13 is an end view omitting two cutting teeth, and Fig. 14 is a section along lines 14—14 of Fig. 13.

Fig. 15 and Fig. 16 are diagrammatic views of another way of forming a cutting edge, and of resharpening the tool. Fig. 15 is a plan view and Fig. 16 is a section along lines 16—16 of Fig. 15.

Fig. 17 is a simplified and partial front view of a device for cutting gears with a tool constructed in accordance with the present invention.

Fig. 18 is a plan view corresponding to Fig. 17 and showing a simplified tool and a gear blank in corresponding relative position.

Fig. 19 is a diagrammatic development of a tool constructed in accordance with the present invention.

Fig. 20 is a sectional view illustrative of the cutting action of a tool constructed in accordance with the present invention.

In Fig. 1 and Fig. 2, numeral 11 denotes a cutting tool having identical cutting teeth 12 arranged in a circle about its axis of rotation 13. The cutting teeth 12 are equally positioned lengthwise of axis 13 and have each a general helical direction, so that tool 11 has the general appearance of a helical pinion or multiple start worm.

Cutting teeth 12 contain cutting edges 15, 16, formed as the intersection of cutting faces 17, 18 with the tooth sides 19, 20 respectively. These cutting edges are for finish cutting the two sides of the teeth of a gear blank. A cutting edge 15 and its cutting face 17 extend upwardly and backwardly on their cutting tooth 12. In other words cutting edge 15 does not extend in a plane substantially perpendicular to the direction of a cutting tooth (12), as conventional cutting edges do, but extends upwardly and lengthwise of the cutting tooth as well, as clearly illustrated in the drawings. The purpose of this arrangement will be fully disclosed hereafter.

A cutting edge 16, and its hooked cutting face 18 extend downwardly and backwardly on their cutting tooth 12.

Before going into further explanation of details reference is made to Figures 7 to 12. In Fig. 7 and Fig. 8 the mesh between a spiral pinion or worm 22 with a spur gear 23 is illustrated. Spur gear 23 is rotatable on an axis 24 and contains teeth 25, which extend parallel to said axis. Pinion or worm 22 contains helical teeth or threads 26 which during rotation of the pinion on its axis 27 mesh with the teeth 25 of spur gear 23. Gear pairs of this character are sometimes known as spiral gears. They consist of a gear having straight or helical teeth and of a pinion or worm having helical teeth or threads, mounted on an axis (27) offset from and angularly disposed to the axis (24) of the gear. Such gear pairs are known to mesh with point contact only, so that a tooth surface of the pinion contacts with a tooth surface of the gear in a single point at a time. The point of contact moves when the gear pair turn on their axes, and describes a line of action, which can be determined with the known means of the art. The term of spiral pinion will be used hereafter and in the claims with the aforesaid meaning, namely to denote a pinion mounted on an axis offset from and angularly disposed to the axis of a gear and meshing with point contact with said gear.

Usually the pinion axis is set to such an angle that the direction of the tooth helices matches the direction of the teeth 25 at a pitch point 30, which is situated on the pitch circle of the gear and on a line 31 perpendicular to both axes 27 and 24. The line of action of each side of the teeth then passes through said pitch point 30, as well known. Moreover, if the gear pair is provided with involute teeth, having involute profiles in sections perpendicular to their axes, the line of action of each side of the teeth is a straight line 32 coinciding with the joint tooth normal at pitch point 30.

The two sides of the teeth have two lines of action 32, 32', which intersect in the pitch point 30.

During rotation of the gear and of the pinion in mesh with each other a point of contact moves on the line of action and describes two curves on the contacting tooth surfaces, one curve on the tooth surface of the gear and another curve 33 on the tooth surface of the pinion. The present invention makes use of this latter curve (33). In accordance with the present invention, the curve described by the point of contact on the tooth surface of the pinion is embodied as a cutting edge. Inasmuch as a cutting edge of this character contains all the points of gear contact of the pinion, it is capable of contacting progressively with the gear in points of the aforesaid curve, which extends from the root to the top of the gear teeth. The tooth sides of a gear 23 may be formed by rotating a cutting edge or a plurality of cutting edges of the said character in engagement with a rotating gear blank, and by providing feeding motion lengthwise of the axis of the gear blank. The tooth sides of a gear are generated as the locus of the many lines of contact, which correspond to the different positions of feed.

In this process the tool and the blank are turned in timed relation on their axes, like in the conventional process of hobbing gears. Feeding motion is provided lengthwise of the axis of the gear blank, like in the conventional hobbing process.

However whereas in the conventional hobbing process the cutting teeth stay in finishing contact only an instant, the present process furnishes a continuous finishing contact, in which a cutting edge progressively finishes a line extending through the whole active depth on the tooth surface.

The present process not only produces continuous and smooth tooth profiles, but it also avoids the jerks and blows of the conventional hobbing process, through its continuous finishing action.

A further difference resides in the shape of the cutting edges and in the use of a tool having a plurality of equal cutting teeth of equal position lengthwise of the tool axis.

The present process differs from a known process of cutting gears with a rotary pinion shaped cutter by providing a different angular setting of the tool and by providing a different tool. The tool used in said process represents a spur pinion and its axis is set parallel to the direction of the teeth of the gear blank. This known process is not applicable to the production of spur gears, as in this case a tool mounted on an axis parallel to the axis of the gear blank would only roll on the latter and produce no cutting action. Also when applied to the production of helical teeth only an insufficient cutting action is generally obtained.

If on the other hand in this known process a tool is used which represents a spiral pinion in conventional manner, so that the cutting edges are formed by cutting faces which are substantially perpendicular to the direction of the pinion teeth, the tool would not produce the proper tooth shape on the gears.

In contradistinction thereto a tool constructed according to the present invention contains cutting edges extending along different lines, namely preferably along the lines of contact between a pinion having helical tooth surfaces and a gear. With this tool the exact tooth form of the gears may be obtained in a process of continuous rotation which provides an efficient and a very smooth cutting action.

It should be particularly noted that cutting edges which extend along said lines of tooth contact are suited to exactly cut gears of every tooth number, as the shape and position of the lines of contact (33) are independent of the tooth number of a gear blank, as well known. One tool may therefore cut all gears of a given pitch, regardless of their numbers of teeth. This feature constitutes one of the differences of the present invention from the method described in my Patent No. 1,653,686, entitled Method of cutting gear teeth. Another difference resides in the progressive cutting action, with which for instance the tooth profiles of spur gears are finished in single cuts. A still other difference resides in the shape of the tool and in the continuous finish cutting action provided by the cutting edges, there being continuously at least one cutting edge in finishing contact with a gear blank.

The present process might be called a describing generating operation, in which the cutting edges describe the lines of action referred to, and as compared with the moulding generating operation furnished by conventional hobs, where the tooth profiles are formed as lines enveloped by a plurality of cutting edges. It is believed the first application of the describing generating principle to continuous processes of rotation.

Fig. 9 shows a helical pinion or worm member 22 in mesh with a helical gear, whose position is indicated through its outline 35 and its axis 36. Again the mesh takes place along two lines of action, 32, 32', which are straight lines coinciding with the tooth normals at pitch point 30, when pinion 22 and the helical gear (35) are provided with involute teeth and set in conventional manner relatively to each other. The lines of action 32, 32' are differently positioned with respect to the helical gear as compared with the position relatively to a spur gear. However they are equally positioned with respect to pinion 22, regardless of whether said pinion meshes with a spur gear or with a helical gear of equal normal pitch. The curves 33 which extend on the tooth surfaces of the pinion and which contain the points of tooth contact are the same, regardless of whether the pinion meshes with a spur gear, as in Fig. 7, or with a helical gear, as shown in Fig. 9. Accordingly a tool containing cutting edges extending along said lines 33 is capable of accurately generating spur teeth and helical teeth alike.

It is readily understood that the tools and the cutting process here disclosed is not confined to the production of involute gears, but is broadly applicable regardless of the specific form of tooth settled upon. Involute gears are conjugate to racks having straight tooth profiles. Straight profiles 38 of an involute rack are indicated in Fig. 7. The tools and process here disclosed are also applicable to gears based on any other forms of racks, such as for instance a rack having curved profiles 39, as indicated in dotted lines in Fig. 7.

Moreover it is not confined to tools and processes embodying the mesh of a cylindrical pinion (22) with a gear, but also to tools and processes embodying the mesh of a tapered pinion with a gear. Tools and processes embodying the mesh of tapered pinions are not only useful for the production of spiral bevel gears and hypoid gears, but also for the production of cylindrical gears, such as spur gears, helical and herringbone gears, and worms. The purpose of embodying the mesh of a tapered pinion with a cylindrical gear is to provide a relief on the cutting tools in such manner that a cutting edge obtained after resharpening has the exact shape of the initial cutting edge and exactly the same distance from the cutter axis as well. This will be fully described hereafter.

A tapered involute pinion may be devised to mesh with a spur gear 23 (Fig. 7) or with a helical gear 35 (Fig. 9) along the same lines of action 32, 32' as the cylindrical involute pinion 22. For instance a tapered pinion may be devised having the same number of teeth or threads as pinion 22, and having the same peripheral direction at pitch point 30 (Fig. 7, Fig. 9).

Fig. 10 diagrammatically indicates a tapered involute pinion 40 in a view taken at right angles to its axis 41. Pinion 40 is conjugate to the involute rack already referred to, to which also gears 23 and 35 are conjugate, and which is shown in Fig. 10 in a plane section containing axis 41. In Fig. 8 and Fig. 9 the said plane is perpendicular with the drawing plane and appears as a line coinciding with axis 27. When tapered pinion 40 is set in gear mesh, its axis is situated in the aforesaid plane and appears to coincide with axis 27. It is however not parallel to the drawing plane of Fig. 8 or Fig. 9, but inclined to said plane at an angle equal to pitch angle 42, which is indicated in Fig. 10. Pitch point 30 is also indicated in Fig. 10, in which further line 31 is shown, which passes through pitch point 30 and is perpendicular to the gear axis (24). A tapered pinion above described has the same circumferential pitch as cylindrical pinion 22, and if provided with the same number of teeth, must have the same pitch radius at pitch point 30, as is readily understood. The said pitch radius is indicated in dotted line 43, which is perpendicular to axis 41. Numeral 41' denotes the axis of another pinion, having a taper opposite to the taper of pinion 40.

The tooth surfaces of tapered involute pinions are also portions of involute helicoidal surfaces, that is to say of helicoidal surfaces having equal involute profiles in all planes perpendicular to the pinion axis.

The base circle of said involute profile in general is different on the two sides of the teeth on tapered pinions. The base circle can be readily determined with the known methods of descriptive geometry, by first determining the two lines of action 32, 32' in a view lengthwise of the pinion axis. Fig. 11 is such a view. The base circles 45, 46 of the two sides of the teeth are circles concentric with the pinion axis 41 and tangent to the aforesaid straight lines 32, 32', which intersect in pitch point 30. The lead of the helicoidal surfaces can best be determined in a view like Fig. 10. It is equal to the axial pitch multiplied by the number of teeth of the pinion. The axial pitch is the distance of adjacent straight rack profiles 47, or 48 respectively, said distance being measured in the direction of the pinion axis 41. In other words the axial pitch of the involute helicoidal tooth surfaces equals the distance of adjacent plane rack tooth surfaces of the same tooth sides, the distance being measured in the direction of the axis of the considered pinion.

The line of contact, along which a pinion tooth surface progressively contacts with a gear, will now be further described with reference to Fig. 12, which refers to a tooth side of a cylindrical or of a tapered pinion alike. In the view along axis 50, the point of gear contact appears to move at a uniform rate along the projected line of action 32, when the considered pinion is turned uniformly on its axis. Inasmuch as the actual distance travelled by the point of contact on the line of action is known, the distance travelled along line 32 can also be readily determined for a view lengthwise of the pinion axis, Fig. 12. The point of contact is shown in different positions 51, 30, 52, which are equal distances apart on the projected line of action 32, and which correspond to equal turning angles of the pinion. Points 53, 54 of line of contact 33 may therefore be determined by first constructing the positions of a line coinciding with line 32 in the different positions of gear contact considered. So line 32a coincides with line 32 when gear contact is made at point 51, and appears now turned about axis 50 through an angle corresponding to the path 30—51 of the point of contact. Similarly line 32b coincides with line 32 when gear contact is made at point 52, and appears now turned about axis 50 through the same aforesaid angle. Points 53, 54 are located on said lines 32a, 32b respectively and further on circles 55, 56 concentric with axis 50. They can therefore be found by intersecting said concentric circles with the respective lines (32a, 32b). Other points may be determined in the same manner.

A way of directly forming cutting edges extending along a line of contact 33 will now be described with reference to Fig. 13 and Fig. 14, in which numeral 32 again denotes a line of action. A tool 58, which is amply relieved back of its cutting edge 59, is moved along line of action 32, while simultaneously the cutter blank 60 is turned on its axis 61, in timed relation to the motion of the tool. A point of the cutting edge of the tool continuously coincides with a point of the line of action, and thereby forms a line 33 as a continuous cutting edge. Dotted line 62 indicates the profile of the unrelieved tooth surfaces of cutter blank 60. Usually the cutting teeth are relieved back of the cutting edges, and may contain for instance relieve profiles 63, which extend inside of unrelieved profile 62.

Fig. 13 shows the involute profiles of the unrelieved teeth of cutter blank 60. It is seen that tool 58 so to say inscribes a line of tooth contact to cutter blank 60 by following a point of contact along its line of action.

Instead of using a tool 58 having a single cutting edge 59, a milling cutter or grinding wheel may be used for forming the cutting edge 33 and cutting face 64, as is readily understood.

Usually it is unnecessary to reproduce the exact line of tooth contact as a cutting edge. Preferably a good approximation is used, which can be easily reproduced with a minimum of attention. So I may provide plane cutting faces extending in the general direction of the lines of contact 33, and forming cutting edges approximating the lines of contact 33. Plane cutting faces may be very easily resharpened. The outwardly disposed cutting faces may be ground with a disk wheel, and the inwardly disposed cutting faces may be ground for instance with a pencil wheel.

A way of grinding inwardly disposed plane cutting faces will now be described with reference to Fig. 15 and Fig. 16. 18' denotes a cutting face extending along a plane 66 appearing as a straight line in Fig. 16 and extending in the direction of line 67 shown in Fig. 15. Cutting face 18' forms a cutting edge 16 which extends downwardly and backwardly on its cutting tooth, as has been previously pointed out. The cutter is indicated by its general outline and its axis 68. Cutting face 18' may be ground with a pencil wheel 70, whose conical front surface contacts with the plane of the cutting face along a line 71, and which is rapidly rotated on its axis 72. In the grinding or resharpening operation, the cutter is reciprocated in the direction of line 67, and is periodically indexed, to present other cutting faces to the pencil wheel. From time to time the pencil wheel is trued and adjusted, as usual.

While usually the cutting teeth are relieved back of the cutting edges, as on conventional cutters, the relief is here less necessary than on those. On account of the point contact existing between a spiral pinion and a gear, an unrelieved tooth surface of a pinion contacts with the tooth surface of a gear blank only in the one point which forms part of the cutting edge. Even an unrelieved tooth surface of a pinion shaped tool will therefore keep clear of the tooth surfaces operated on except in the very points of cutting engagement. Cutters formed and used in accordance with the present invention contain therefore cutting clearance even without being relieved.

Relief may be provided on the cutters in order to increase said cutting clearance.

Fig. 5 and Fig. 6 illustrate a rotary gear cutting tool 75 formed in accordance with the present invention and relieved back of its cutting edges 15, 16 in usual manner, so that the general aspect of the rotary tool 75 is that of a slightly tapered spiral pinion. While tool 75 is slightly tapered, to provide relief, its cutting edges (15, 16) embody nevertheless the lines of tooth contact of a cylindrical spiral pinion, and the cutting action duplicates or approximates the mesh of a cylindrical spiral pinion. Without provision of relief, tool 75 would be cylindrical.

On tool 75 front cutting faces 76 are indicated, which are substantially perpendicular to the direction of the cutting teeth 77, and which form top cutting edges 78 suited to cut the tooth bottoms. A tool having such cutting faces (76) may serve also for rough cutting. A tool intended solely for finish cutting or fine cutting does not necessarily require front cutting faces such as 76, and may be set to a slightly smaller cutting depth, so that it does not touch the tooth bottom previously cut by a roughing tool.

Preferably relief is provided in a different and novel manner, in accordance with the present invention, as will now be described with reference to Fig. 1, Fig. 2 and Fig. 3.

A tool is made to represent a tapered spiral pinion, as indicated in Fig. 10. The cutting faces are disposed in a manner to face towards the small end of said tapered spiral pinion, so that the small end corresponds to the front of the tool, from which the cutting faces may be seen. If the tool were not relieved, its diameter would then increase back of the cutting edges. It would contain the taper of the spiral pinion represented by it, with the cutting edges starting at the small end.

Relief may be obtained by reducing or preferably by omitting the taper of the unrelieved surfaces, that is to say by using a substantially cylindrical tool for representing a tapered pinion.

Fig. 3 indicates the general outline of a tapered spiral pinion 80 provided with unrelieved tooth surfaces suited to mesh with point contact with the desired tooth surfaces of a gear blank. Often the tooth surfaces of spiral pinion 80 are involute helicoidal surfaces; and the two sides of the unrelieved tooth surfaces are helicoidal surfaces of different axial lead, as has been pointed out with reference to Fig. 10. A tapered pinion of this character may mesh in absolute accuracy with spur gears, helical and herringbone gears, worms, and also with spiral bevel gears, hypoid gears, worm gears, along two straight lines of action, which result in lines 15', 16' of tooth contact on its tooth surfaces.

Cutting tool 11 (Fig. 1 and Fig. 2) contains cutting edges 15, 16 extending substantially along the aforesaid lines of tooth contact 15', 16' of tapered spiral pinion 80 whose mesh is duplicated or approximated by the tool. The general outline of tool 11 is cylindrical, and back of the cutting edges it recedes from the tapered outline of the unrelieved spiral pinion 80. The sides and tops of the cutting teeth 12 back of the cutting edges extend backwardly and inwardly as compared with the unrelieved teeth or threads.

In both cases (Fig. 1, Fig. 2 and Fig. 5, Fig. 6) the outline of the relieved tool and the outline of the unrelieved pinion represented have a different inclination, the rear end of the tool having a smaller diameter than the rear end of the pinion. However while in the embodiment illustrated in Fig. 5 and Fig. 6 and in conventional cutter practice a cylindrical pinion is represented by a tool tapered for the sake of relief, the preferred embodiment of the present invention represents a tapered pinion by a cylindrical tool. The advantage is apparent: The cutting edges obtained after repeated resharpening of the tool are identical with the initial cutting edges and have the same distance and position with respect to the tool axis, which is not possible with a tapered tool representing a cylindrical pinion. Accordingly the errors and complications resulting in the latter case from the changing form and position of the cutting edges after resharpening are entirely avoided.

A tool representing a tapered pinion is set to the position corresponding to said tapered pinion. Fig. 17 and Fig. 18 illustrate the position of a cylindrical tool 11 of the character shown in Fig. 1 and Fig. 2 in cutting engagement with a gear blank 82. Tool 11 represents a tapered spiral pinion 80 of the character described with reference to Fig. 3, and its cutting edges embody the mesh of said pinion. Tool 11 is rotated on its axis 83 which is offset from and angularly disposed to the axis 84 of gear blank 82. Numeral 85 denotes the point of closest approach of the tool axis 83 with respect to axis 84 of the gear blank. The cutting edges of the tool are disposed back of said point, that is to say the mean points of said cutting edges have an axial position further towards point 86 of axis 83. This position is characteristic to cutting edges embodying the mesh of a tapered spiral pinion.

Preferably the tool axis 83 is inclined at a fixed acute angle to line 91, which is a radius passing through axis 84 and pitch point 30 of the mesh. The tool axis 83 is angularly adjustable about said line 91, so that setting angle 94 may be changed to accommodate straight spur gears and helical gears alike. Line 91 intersects both axes 83 and 84 and is perpendicular to blank axis 84.

Gear blank 82 is mounted on a slide 87, which may be adjusted along V-shaped guides 88 of a bed 89, to accommodate gears of various diameters. Adjustment is made in the direction of line 91, which is inclined to a plane perpendicular to the tool axis 83.

In operation tool 11 and gear blank 82 are rotated in engagement with each other, while at the same time slow feeding motion is provided between the tool and the gear blank in the direction of axis 84 of the gear blank. Like in known hobbing processes, tooth surfaces of all the teeth are simultaneously finished in a process of continuous rotation of a gear blank. Usually both sides of the teeth are cut at the same time.

Tools constructed in accordance with the present invention are resharpened preferably by regrinding the cutting faces, so that cutting edges are formed further back on the sides of the cutting teeth. The side surfaces 19, 20 (Fig. 1, Fig. 2) are helicoidal surfaces concentric with the tool axis. In the embodiment illustrated in Fig. 1 and Fig. 2 said helicoidal surfaces 19, 20 have the same lead. The initial and the later cutting faces differ solely in their axial position, inasmuch as the later cutting faces are disposed nearer to the rear end of the tool. They are identical surfaces otherwise equally positioned with respect to the tool axis. For gear cutting, tools are set from the position of their cutting edges, as is readily understood.

In principle it is immaterial whether in resharpening a tool the cutting faces are ground, or whether the resharpening operation consists in grinding the side surfaces of the cutting teeth. While I usually prefer to regrind the cutting faces, the invention can also be practised with tools resharpened on the sides of their cutting teeth.

A cutting edge (15, 16 Fig. 2) has a mean inclination to a plane perpendicular to the general direction of its cutting tooth (12) at least twice as large as the mean inclination to said plane of the profile of said cutting tooth in a plane perpendicular to the tool axis. Moreover a cutting edge 15 or 16 has a mean inclination larger than twenty degrees to a plane perpendicular to the tool axis. My invention is intended to be broad enough to contain all cases of the aforesaid characteristics, also when the cutting edges differ materially from lines of contact of a spiral pinion.

Cutting tool 11, while representing a tapered spiral pinion, has a substantially cylindrical general outline. The cutting edges 15, 16 correspond to the lines of successive tooth contact of a tapered spiral pinion, and their outward ends 95, 96 have different distances from the axis of said pinion and from the tool axis. The two cutting edges 15, 16 generally differ from each other, as explained with reference to Fig. 11, and the side surfaces 19, 20 are helicoidal surfaces of equal lead. They can be considered as described by their respective cutting edges or cutting lines, when said lines are moved in a helical motion about the tool axis with the given lead. The helicoidal side surfaces, which may be described by differently inclined cutting edges fully set forth, have different general inclinations with respect to the tool axis. The profiles 97, 98 of an axial section (Fig. 1) contain different general inclinations with respect to the tool axis, and the profiles 99, 100 (Fig. 2) of said side surfaces in a plane perpendicular to the tool axis have different inclinations with respect to their radii. In Fig. 2 profile normals are indicated at points of equal radii, to illustrate said different inclinations. The inclinations can be numerically determined from the disclosure here given and with the known methods of descriptive geometry.

The helicoidal surfaces 19, 20 are ground preferably with a grinding wheel having a straight profile in an axial section, that is to say with wheels having plane or conical grinding surfaces. The cone angle of said grinding surfaces may be positive or negative, in which latter case the grinding surface is the inside surface of a cup shaped wheel. Often one of the two side surfaces 19, 20 is ground with a grinding wheel of positive cone angle, whereas the other side surface is ground with a cup wheel of negative cone angle.

Grinding is done by traversing the tool blank in a helicoidal path past a grinding wheel, and by periodically indexing the tool blank.

Fig. 4 indicates a cutting tool of the same general character as tool 11 of Fig. 1 and Fig. 2, and differing from the latter largely through the provision of slots 102, through which the cutting edge 103 may be resharpened. Cutting edge 103 extends backwardly and downwardly on its cutting tooth, whereas cutting edge 104 extends backwardly and upwardly.

In the development Fig. 19 of a cutting tool constructed in accordance with the present invention, a plurality of pairs of cutting edges 105, 106 are diagrammatically indicated. Their cutting teeth 107 are arranged in a circle about the tool axis and are inclined to the tool periphery indicated as a straight line 108 in development. The mean points 109, 110 of the cutting edges are preferably disposed on the same circle 112, also shown as a straight line.

The continuous and progressive cutting action already described is further illustrated through Fig. 20, where cutting edge 113 is shown in progress of taking a continuous cut along a line starting on the tip of gear tooth 114 and ending at its root, and where cutting edge 115 is shown in progress of taking a continuous cut along a line starting at the root of gear tooth 116 and ending at its tip. The cutting motion is in a direction substantially perpendicular to the drawing plane Fig. 20, that is to say lengthwise of the teeth.

Numerous changes and modifications may be made in my invention without departing from its spirit, by simply applying the established practice of the art to the disclosure here given. For definition of the scope of the invention it is relied on the appended claims.

What I claim is:

1. A rotary gear cutting tool for forming tooth surfaces in a process of continuous rotation of a gear blank, containing an inclined cutting edge connecting the top and the root of a cutting tooth angularly disposed to the periphery of said tool, so that said cutting edge extends partly in the direction of said cutting tooth, said cutting edge and a plane perpendicular to the general direction of said cutting tooth including an angle at least twice as large as the angle between said plane and the profile of said cutting tooth in a plane perpendicular to the tool axis.

2. A rotary gear cutting tool, containing a plurality of equal cutting teeth arranged about the tool axis and equally positioned lengthwise of said axis, cutting edges being formed on said cutting teeth by inclined cutting faces, the cutting faces of one side of the cutting teeth extending upwardly and backwardly on said cutting teeth, the cutting faces of the other side extending downwardly and backwardly on said cutting teeth, and the cutting edges of at least one side of the teeth having a mean inclination of at least twenty degrees with respect to a plane perpendicular to the tool axis.

3. A rotary gear cutting tool for forming straight and helical tooth surfaces in a process of continuous rotation of a gear blank, containing a plurality of equal cutting teeth arranged in a circle about the tool axis and inclined to the periphery of said tool, cutting edges being formed on said cutting teeth, the cutting edges of one side of said cutting teeth extending backwardly and upwardly on said cutting teeth, and the cutting edges of the other side extending backwardly and downwardly on said cutting teeth.

4. A rotary gear cutting tool for forming spur gears and helical gears in a process of continuous rotation of a gear blank, containing a plurality of equal cutting teeth arranged in a circle about the tool axis and inclined to the periphery of said tool, curved cutting edges being formed on said cutting teeth by plane cutting faces, a cutting edge extending backwardly and upwardly on a cutting tooth and being inclined to a plane perpendicular to the tool axis.

5. A rotary gear cutting tool, containing a plurality of equal cutting teeth arranged in a circle about the tool axis and inclined to the periphery of said tool, the cutting edges of one side of said cutting teeth extending backwardly and upwardly on said cutting teeth, the cutting edges of the other side extending backwardly and downwardly on said cutting teeth, the two sides of said cutting teeth back of said cutting edges having profiles differently inclined to the axis of said tool.

6. A rotary gear cutting tool for forming gears in a process of continuous rotation of a gear blank, containing a plurality of equal cutting teeth arranged in a circle about the tool axis and inclined to the periphery of said tool, the cutting edges of one side of said cutting teeth extending backwardly and upwardly on said cutting teeth, the cutting edges of the other side extending backwardly and downwardly on said cutting teeth, and the tops of said cutting teeth back of said cutting edges extending along helices concentric with the tool axis.

7. A rotary gear cutting tool adapted to operate with its axis angularly disposed to and offset from the axis of a gear blank, said tool containing a plurality of equal cutting teeth arranged about its axis and equally positioned lengthwise of said axis, cutting edges extending obliquely from top to root on said cutting teeth and being formed conjugate to a gear to be cut in the manner of the lines of successive tooth contact of a tapered spiral pinion represented by said tool.

8. A rotary gear cutting tool adapted to operate with its axis angularly disposed to and offset from the axis of a gear blank, said tool containing a plurality of equal cutting teeth arranged about its axis and equally positioned lengthwise of said axis, cutting edges extending obliquely from top to root on said cutting teeth and being formed conjugate to a gear to be cut in the manner of the lines of successive tooth contact of a tapered spiral pinion represented by said tool, said pinion having involute side surfaces.

9. A rotary gear cutting tool containing a plurality of equal cutting teeth arranged in a circle about the axis of rotation of said tool, one side of said cutting teeth forming an acute angle with a plane perpendicular to said tool axis, the other side forming an obtuse angle with said plane, curved cutting edges formed on said cutting teeth, the cutting edge of said one side of a cutting tooth extending backwardly and outwardly with respect to said tool axis.

10. A rotary gear cutting tool adapted to operate with its axis of rotation angularly disposed to and offset from the axis of a gear to be cut, containing a plurality of equal cutting teeth arranged in a circle about the axis of rotation of said tool and having cutting edges on their sides, one side of said cutting teeth forming an acute angle with the peripheral direction of the tool, the other side forming an obtuse angle with the peripheral direction, the cutting edge of said one side of a cutting tooth extending backwardly and outwardly with respect to said tool axis, and the cutting edge of the other side of said cutting tooth extending backwardly and inwardly with respect to said tool axis.

11. A rotary gear cutting tool adapted to operate with its axis of rotation angularly disposed to and offset from the axis of a gear to be cut, containing a plurality of equal cutting teeth arranged in a circle about the axis of rotation of said tool and having cutting edges on their sides, one side of said cutting teeth forming an acute angle with the peripheral direction of the tool, the other side forming an obtuse angle with the peripheral direction, the cutting edge of said one side extending backwardly and outwardly with respect to said tool axis, the cutting edge of the other side extending backwardly and inwardly with respect to said tool axis, and the outside ends of said two different cutting edges having different positions lengthwise of said tool axis.

12. A rotary gear cutting tool representing a spiral pinion adapted to mesh along the same line of action with gears of equal normal pitch and different numbers of teeth, namely along a line substantially perpendicular to the tooth side surfaces of said pinion, said tool having a continuous curved cutting edge extending obliquely from the top to the flank on a tooth surface of said pinion, in the general direction of the line in which said line of action intersects said tooth surface.

13. A rotary gear cutting tool representing a spiral pinion adapted to mesh along the same line of action with gears of equal normal pitch and different numbers of teeth, namely along a line substantially perpendicular to the tooth side surfaces of said pinion, said tool being adapted to be fed lengthwise of the axis of a gear to be finished and having a continuous curved cutting edge which extends obliquely from the top to the flank on a tooth surface of said pinion, in the general direction of the line in which said line of action intersects said tooth surface, said cutting edge being formed as the intersection of a cutting face with a helical side surface of constant lead.

14. A rotary gear cutting tool adapted to operate with its axis of rotation angularly disposed to and offset from the axis of a gear to be cut, containing a plurality of equal substantially helical cutting teeth arranged in a circle about the axis of rotation of said tool and having identical pairs of cutting edges on their sides, all the cutting teeth of said tool having the same position lengthwise of said tool axis, the two side cutting edges of a cutting tooth having general directions askew to each other and being formed by different and separate cutting faces, the outside ends of said cutting edges having different positions lengthwise of said tool axis and different distances from said axis.

15. A rotary gear cutting tool adapted to operate with its axis of rotation angularly disposed to and offset from the axis of a gear to be cut, containing a plurality of equal substantially helical cutting teeth arranged in a circle about the axis of rotation of said tool and having identical pairs of cutting edges on their sides, all the cutting teeth of said tool having the same position lengthwise of said tool axis, the two side cutting edges of a cutting tooth having general directions askew to each other and being formed by different and separate cutting faces, the side surfaces of said cutting tooth containing equal cylindrical helices concentric with said tool axis.

16. A rotary gear cutting tool adapted to operate with its axis of rotation angularly disposed to and offset from the axis of a cylindrical gear to be cut and to be fed along the axis of said gear, containing a plurality of equal and substantially helical cutting teeth arranged in a circle about said tool axis, each cutting tooth containing side cutting edges formed to engage the whole depth of the final tooth sides of a gear to be cut, in the manner of a line of the tooth surface of a tapered pinion fully conjugate to said gear, the side surfaces and the top surface of each cutting tooth being relieved with respect to the tooth surfaces of said tapered pinion, so that all said surfaces contain cylindrical helices of equal lead and concentric with the tool axis.

17. A rotary gear cutting tool adapted to operate with its axis of rotation angularly disposed to and offset from the axis of a cylindrical gear to be cut and to be fed along the axis of said gear, containing a plurality of equal and substantially helical cutting teeth arranged in a circle about said tool axis, each cutting tooth containing side cutting edges formed to engage the whole depth of the final tooth sides of a gear to be cut, in the manner of a line of the tooth surface of a tapered pinion fully conjugate to said gear, the side surfaces and the top surface of each cutting tooth being relieved with respect to the tooth surfaces of said tapered pinion, so that all said surfaces contain cylindrical helices of equal lead and concentric with the tool axis, the two side surfaces of each cutting tooth having different general inclinations with respect to said tool axis.

ERNEST WILDHABER.